3,300,524
INHIBITION OF HYDROLYSIS OF FATS
Frank A. Norris, La Grange, and Donald P. Grettie, Chicago, Ill., assignors to Swift & Company, Chicago, Ill., a corporation of Illinois
No Drawing. Filed Jan. 14, 1963, Ser. No. 251,007
8 Claims. (Cl. 260—398.5)

This invention relates to a method for preventing hydrolysis of fats during storage. More particularly, the invention relates to the inhibition of formation of free fatty acids from the hydrolysis of animal fats and vegetable oils, such as those oils present in oilseed materials, by the treatment of such materials with an active chlorine-containing material.

Fats useful for conventional purposes are ordinarily present as neutral glycerides and usually must be substantially free of significant quantities of free fatty acids. When these fats are to be used for edible purposes, they are normally refined to remove any free fatty acid present. The cost of this refining represents a distinct monetary loss in the preparation of fatty materials. These undesired fatty acids normally result from the hydrolysis of the fatty material. This hydrolysis is prevalent in fatty tissues derived from animals, and therefore, unless such tissue is maintained at a very low temperature or heated sufficiently to inactivate the lipases present, the free fatty acid content of tissue increases rapidly. For example, the following table shows that visceral tissue stored at 34° F. increases rapidly in free fatty acid with increase in storage time.

TABLE I.—PERCENTAGE OF FREE FATTY ACIDS AT VARIOUS HOLDING TIMES

| Type of Fat | 20 Hours, Percent | 60 Hours, Percent | 100 Hours, Percent |
|---|---|---|---|
| Ruffle fat | 0.9 | 2.9 | 5.0 |
| Leaf fat | 0.2 | 0.6 | 1.0 |
| Caul fat | 0.1 | 0.3 | 0.7 |
| Back fat | 0.1 | 0.2 | 0.5 |

Storage at higher temperatures produces a great increase in the free fatty acids. Thus, the following table illustrates that at a temperature of 72–74° F. a three to fourfold increase in free fatty acid results. At such temperatures, other enzymes may also be present, attacking protein and producing materials which have undesirable flavors and contaminate the oil.

TABLE II.—PERCENTAGE OF FREE FATTY ACIDS IN LEAF FAT STORED AT VARIOUS TEMPERATURES

| Storage time | 40° F., percent | 72–74° F., percent |
|---|---|---|
| 20 hours | 0.05 | 0.17 |
| 60 hours | 0.13 | 0.46 |
| 100 hours | 0.22 | 0.85 |

In addition to animal fats, oil derived from oil bearing fruits also develop free fatty acids after harvesting. Palm oil is a good example of this. This oil generally contains more than 2 to 3% free fatty acid, due to the active lipase present in the fruit. Olives are another example, unrefined olive oil normally containing from 1 to 5% or higher free fatty acid content.

Although oilseeds are less sensitive to fatty acid buildup than are animal tissue and oil bearing fruits, the free fatty acid present in oilseeds generally presents a serious problem. In the case of such seeds as flaxseed, which are raised in a relatively cool climate, storage temperatures may be sufficiently cool to avoid fatty acid buildup. This is also true to a lesser extent with soybeans. However, cottonseeds which are grown in warmer climates are difficult to cool sufficiently to inhibit the free fatty acid buildup probably resulting from enzyme action. Much of the damage is done after summer harvesting and before the outside temperature is low enough to allow the seeds to be cooled to a sufficiently low temperature to avoid this enzyme action. There is some question as to whether enzymes in the seeds or microorganisms on the surface of the seeds are responsible for fat hydrolysis. But in either case, hydrolysis of the fatty oil to free fatty acid results.

The cottonseed industry may be taken as a typical example of the problem caused by free fatty acid buildup in oilseed materials. Cottonseed is normally purchased at harvest time and then stored until it can be processed. Since the harvest period may be as short as 2 to 4 weeks, and cottonseed mills prefer to operate year round, it is obvious that much of the raw material must be stored for several months before being processed. This storage presents no problem when good quality dry cottonseed is stored. However, in many sections of the country, harvested cottonseed is wet and contains appreciable amounts of free fatty acid (from about 1.5 to about 10% or more). When such wet seeds are stored, there is a continued increase in the free fatty acid, and this increase accelerates with the passage of time. Thus, when the seeds are processed, they contain much more free fatty acid, and consequently less saleable neutral oil, than was present when the seeds were purchased.

Generally, in the storage of oil-bearing seeds such as cottonseed, the seeds are placed in a large building equipped with loading and unloading facilities and provided with air ducts and suitable fans so that outside air may be blown or sucked into the storage seed. In this way the seed can be gradually brought down to the temperature of the outside air and if the relative humidity of the air is low enough, the seed may also be dried to a limited extent. This method is not very satisfactory due to channeling which occurs in the air stream, the fact that temperature and humidity conditions of the air are often unsuitable for this treatment, and to the power cost involved. It is estimated that in the United States approximately one dollar is lost on each ton of cottonseeds processed due to deterioration during storage; and this deterioration is due primarily to the buildup of free fatty acids in the cottonseed.

A number of methods have been tried in the past to inhibit the hydrolysis of the fats to free fatty acids Among these is the keeping of the fat containing raw material cool. This method is, however, generally too expensive to be feasible. Another method of inhibiting this hydrolysis has been heating the raw material to a temperature sufficient to inactivate the enzymes. This method can be effective, but it is normally expensive and the undesirable effects of the heat treatment may more than offset the beneficial effects of this treatment. The addition of chemicals has also been attempted as a mode of inhibiting this hydrolysis. Despite the fact that extensive research has been carried out, no commercially acceptable chemical has heretofore been produced to inhibit fat hydrolysis during the storage of fat-containing materials Among the chemicals used have been propylene glycol dipropionate, 4,6-bis-chloromethyl benzene or xylene, and various halohydrins such as ethylene chlorohydrin and the like. Other chemical inhibitors which have been used in the past include compounds containing the aldehyde group, cupric-mercuric-ferric- and cobaltous ions, fluorideodide-bromide or chloride ions (chloride being the least ffective), and chloro-bromo-iodo-acetic acids. In general, these inhibitors have been toxic, expensive, or not ffective on a commercial scale.

It is therefore an object of the instant invention to proide an improved process for inhibiting the hydrolysis of ats to free fatty acids.

Another object of the instant invention is to provide a rocess for inhibiting the hydrolysis of fats to free fatty cids by treating such fats with an active chlorine-conaining material.

A further object of the instant invention is to provide process for inhibiting the hydrolysis of animal fats to ree fatty acids by contacting such animal fats with an acive chlorine-containing material.

Still another object of the invention is to provide a rocess for inhibiting the formation of free fatty acids n oilseeds, by treating such oilseeds with an active chloine-containing material.

Additional objects if not specifically set forth herein vill be readily apparent to those skilled in the art from he detailed description of the invention which follows.

Generally, the instant process comprises treating a atty material with an active chlorine-containing material. uch treatment causes free chlorine to come in contact vith the lipase enzymes of the fatty material and thereby nhibit the hydrolysis of the fatty material to free fatty cids. The fatty material treated may be animal fat, the il from oil-bearing fruits or oilseeds, such as cottoneeds or the like. Active chlorine-containing materials re those which easily liberate free chlorine.

More particularly, the instant invention comprises the reatment of a fatty material with a solution of sodium ypochlorite or another source of active chlorine, such as hlorine itself, hypochlorous acid, alkali metal and alkaline arth metal hypochlorites such as calcium hypochlorite nd sodium chlorite, or chlorine dioxide. This treatment rovides an economical and effective way of preventing he formation of free fatty acids in the fatty materials. As pointed out above, there is disagreement as to whether he buildup of free fatty acids in oilseeds is due to the nzymes in the seed or to the action of microflora present n the outer surface of the seeds. However, our treatnent has been found to inhibit the formation of free fatty cids on the cottonseeds in storage under adverse condiions as well as to inhibit glyceride hydrolysis in an isoated enzyme system where only pancreatic lipase is presnt. Thus, it is obvious that the instant process would nhibit hydrolysis whether it is caused by enzyme action or microflora.

In the treatment of oilseed materials, other oxidizing gents such as hydrogen peroxide, sodium peroxide, calium peroxide, sodium perborate, potassium dichromate nd potassium permanganate can be used, but these oxilizing agents are not preferred since in most cases they re difficult to handle, expensive and undesirably conaminate the raw material for future food or feed use. The solution of active chlorine-containing materials, such s sodium hypochlorite, may be brought into contact with he oilseed material by soaking the seeds in a solution of the active chlorine-containing material, by spraying he material on the seeds, or by similar methods. The ictive chlorine-containing materials are useful since they tre oxidizing agents which, in general, inhibit enzymes; nd also because they liberate free chlorine which difuses through the seed mass and thus extends the activity generally through the mass. As a result of this treatment, he fat splitting enzymes of the oilseed are inhibited so hat the seeds may be stored under relatively adverse conditions without appreciable buildup in free fatty acids. As a result, this treatment makes it possible to avoid pecial storage facilities for the seeds, and storage time nay be greatly prolonged.

In regard to the use of the instant process for the tabilization of fatty animal tissue, such treatment becomes necessary since it is often desirable to hold the fatty tissue for a time while accumulating enough for rendering. During this holding time, free fatty acid develops rapidly, particularly if refrigeration is not feasible. By the treatment of the fatty tissue with sodium hypochlorite solution, or other compounds containing active chlorine, the development of free fatty acids is greatly curtailed, even when the tissue is stored under rather drastic storage conditions, such as at 37° C. for 16 hours.

The process of our invention is further illustrated by the following examples, although it is not limited thereby but only by the appended claims.

*Example I*

950 grams of good quality cottonseeds were soaked for five minutes in a 0.5% aqueous solution of sodium hypochlorite (.238% available chlorine), and then spread on a tray and allowed to dry at room temperature. An equal quantity of identical seeds were soaked in the same way in distilled water and allowed to dry similarly. At the end of the immersion, the moisture content of the control was about 30% and that of the treated sample 33%. By the next day, the control had dropped to a moisture content of 11.5%, but the treated sample was still at 23.6% moisture. The corresponding free fatty acid of the two samples was 1.0% in the control and 0.6% in the treated sample. These samples were placed in desiccators maintained at 95° F. and equipped to maintain about 85% relative humidity. Periodic samples were withdrawn from the desiccators to test the change in free fatty acid content. The results of these tests are indicated by the following table.

PERCENTAGE OF FREE FATTY ACID AT VARIOUS STORAGE PERIODS

| Sample | At Start | 4 weeks | 7 weeks | 12 weeks |
| --- | --- | --- | --- | --- |
| 1. Control sample: | | | | |
| Free fatty acids | 1.0 | 5.0 | 12.0 | 22.7 |
| Moisture | 11.5 | | 13.8 | 14.5 |
| 2. Test sample: | | | | |
| Free fatty acids | 0.6 | 4.3 | 4.2 | 6.9 |
| Moisture | 23.6 | | 15.6 | 15.3 |

These tests clearly show that although there was some initial buildup in free fatty acid content of the treated samples, probably because of the very slow rate at which the samples dried on standing, the cottonseed treated with sodium hypochlorite was able to maintain a much lower free fatty acid content than did the control sample. It should be noted that these storage conditions were very severe since a combination of high humidity and high temperature was used.

The following example was carried out to demonstrate the effectiveness of the instant process in inhibiting enzyme action which hydrolyzes the fats to free fatty acids. This example shows that the instant treatment is effective whether the hydrolysis results from microorganisms on the oilseeds or from enzymes present therein.

*Example II*

0.5 gram of cottonseed oil was placed in a 125 cc. glass-stoppered bottle. 5 cc. of bile in glycerol solution was then added, together with some glass beads. The bottle was placed in boiling water and shaken until the oil was completely dissolved. The bottle and its contents were then cooled to room temperature and 10 cc. of a 0.05 molar ammonium chloride-ammonia buffer of pH 8 was added. 100 milligrams of calcium chloride in water and 0.25 cc. of a 3% solution of penolphthalein were then added. Subsequently, enough water was added to make the total volume 30 cc. The enzyme was then added as a water solution and mixed. An aliquot of 5 cc. was withdrawn and pipetted into 75 cc. of a mixture of 9 volumes of alcohol and one volume of ether. The solution was titrated with an alcoholic potassium hydroxide, The digest was kept at a constant temperature and minute amounts of strong ammonia were added to it whenever the pH became more acid. At varying periods of time, 5 cc. aliquots of the digest were withdrawn and titrated. The difference between the titration at any given time and the titration at the start represents the quantity of free fatty acids set free. In the titration, the ammonia that has been added has no influence. In this test, 20 milligrams of pure enzyme were added to each tube and the tube maintained at 104° F. during the digestion period. A water solution of sodium hypochlorite was added as an inhibitor at active chlorine concentrations of 0.315% to 0.00011%, corresponding to a range of 1 to 3150 parts per million. The percent inhibition of lipase, expressed by the following formula:

$$\frac{\text{titration of control} - \text{titration of test run}}{\text{titration of control}} \times 100$$

was found to be as follows:

| Parts per million of active chlorine: | Percent inhibition of lipase |
|---|---|
| 3150 | 96 |
| 1630 | 82 |
| 810 | 82 |
| 390 | 71 |
| 110 | 54 |
| 11 | 6 |
| 1 | 0 |

It is apparent from this example that the instant active chlorine treatment of fatty material to prevent hydrolysis is effective in pure enzyme systems.

The following example illustrates the effect of the instant treatment on fatty animal tissue.

*Example III*

Two liters of fatty tissue to which 100 parts per million of active chlorine had been added was compared with two liters of fatty tissue containing 1000 parts per million of propyl para-hydroxy-benzoate, which is a system that prevents bacterial growth only. The same fatty pork tissue to which these additives were added, was used alone as a control. The samples were incubated at 98.6° F. for 16 hours and then rendered to obtain sufficient fat for free fatty acid titration. Results were as follows:

| Sample: | Percent free fatty acid |
|---|---|
| Pork fatty tissue-control | 7 |
| Control plus 100 p.p.m. active chlorine | 2.2 |
| Control plus 1000 p.p.m. benzoate | 3.08 |

The above table shows that the hypochlorite is effective in the inhibition of free fatty acid formations to a degree beyond that which could be attributed to the prevention of bacterial growth alone. It should be noted that in connection with the inhibition of free fatty acid formations in animal fats an oxidizing agent like hydrogen peroxide is completely ineffective since it is rapidly destroyed by catalase enzyme present in the pork tissue.

*Example IV*

Several factory production lots of grease were made from pork skin fatty tissue and observed to have a free fatty acid content ranging from 8–20% when no inhibitor was used. However, when 200 p.p.m. of active chlorine was added as sodium hypochlorite, the grease had a maximum free fatty acid content of 1.6–4%. This result showed the pronounced inhibitory effect of the hypochlorite.

The present invention comprehends the treatment of any oil seed or other oil bearing material in which free fatty acids are produced on storage. By this, we mean seeds such as cottonseeds, soybeans, peanuts, rice bran, and flaxseed; as well as fruit coat fats; and animal tissue. By the term "oilseeds," we do not mean to limit our invention to the actual seeds but to cover such things as delinted oil seeds, oil seed meats, oilseed flakes, and other oilseed fragments encountered in the processing of the whole seeds to the finished product.

It is obvious that many modifications and variations of the instant invention may be made without departing from the spirit and scope thereof, and therefore the invention should be limited only to the scope of the appended claims.

We claim:
1. A process for inhibiting the hydrolysis of fats derived from oil bearing fruits to free fatty acids, comprising: treating the fats with an aqueous solution of an active chlorine-containing material.
2. The process of claim 1 wherein the fat is a fruit coat fat.
3. A process for inhibiting the formation of free fatty acids in oil seeds, comprising: treating the oil seeds with an aqueous solution of an active chlorine-containing material, whereby free chlorine from the material inhibits the deteriorative effect of the lipase enzyme and microflora present in said seeds on the oil of said seeds.
4. The process of claim 3 wherein the active chlorine-containing material is selected from the group consisting of hypochlorites, chlorine, hypochlorous acid, sodium chlorite, and chlorine dioxide.
5. The process of claim 3 wherein the oil seeds are cottonseeds.
6. A process for inhibiting the hydrolysis of the oil component of oil seeds to free fatty acids, comprising: contacting the seeds with an aqueous solution of a hypochlorite containing from about 110–3150 parts per million of active chlorine, whereby said active chlorine inactivates the lipase enzymes and microflora present in the seeds.
7. The process of claim 6 wherein the hypochlorite is sodium hypochlorite.
8. The process of claim 6 wherein the oil seeds are cottonseeds.

References Cited by the Examiner

UNITED STATES PATENTS

| 2,379,335 | 6/1945 | Baker. |
| 2,546,568 | 3/1951 | Taylor | 99—222 X |
| 2,584,972 | 2/1952 | Altschul et al. | 260—398.5 X |

OTHER REFERENCES

Altschul et al.: (I), Plant Physiology, vol. 21, pp. 573 to 574 (1946).

CHARLES B. PARKER, *Primary Examiner.*

A. H. SUTTO, *Assistant Examiner.*